G. SIBBALD.
Magic Lantern.
No. 42,412.
Patented April 19, 1864.
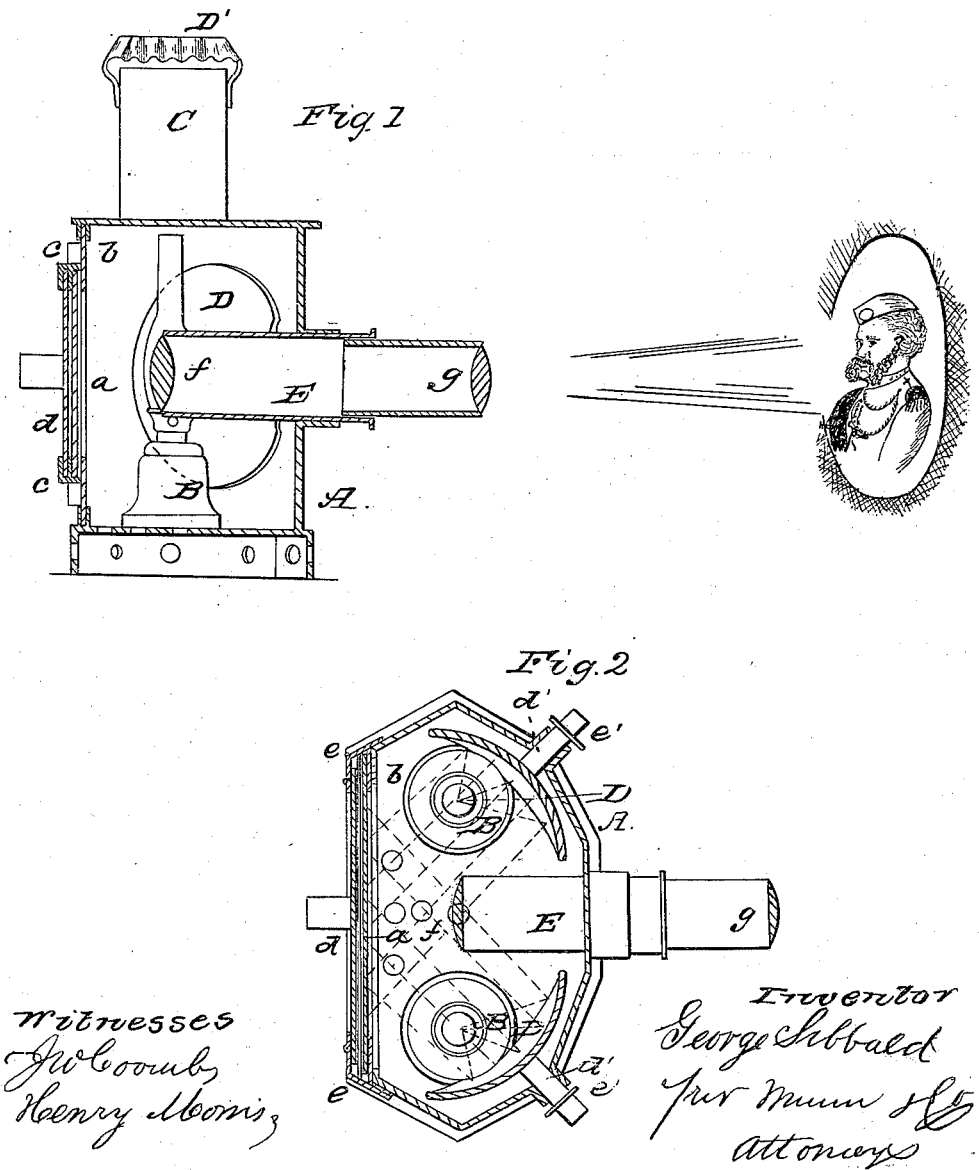

UNITED STATES PATENT OFFICE.

GEORGE SIBBALD, OF PHILADELPHIA, PENNSYLVANIA.

IMPROVEMENT IN MAGIC-LANTERNS.

Specification forming part of Letters Patent No. 42,412, dated April 19, 1864.

*To all whom it may concern:*

Be it known that I, GEORGE SIBBALD, of Philadelphia, in the county of Philadelphia and State of Pennsylvania, have invented a new and useful Improvement in Magic-Lanterns; and I do hereby declare that the following is a full, clear, and exact description of the same, reference being had to the accompanying drawings, forming a part of this specification, in which—

Figure 1 represents a longitudinal vertical section of my invention. Fig. 2 is a horizontal section of the same.

Similar letters of reference in both views indicate corresponding parts.

This invention consists in a magic-lantern producing an image on a screen outside the lantern by the reflection of a picture of any desired description placed in the interior of the lantern and exposed to the rays of light obtained from one or more lamps or other artificial sources of light; also, in a picture-holder fitted into the side of a magic-lantern opposite the lens-tube, in combination with one or more lamps and reflectors in such a manner that the light obtained by the lamp or lamps, and increased in intensity by the action of the reflector or reflectors, illuminates the picture in the holder sufficiently to give a distinct and plain image of greater or smaller dimensions, according to the size of the instrument and of the lenses, and opaque pictures made on paper, porcelain, or any other suitable material, can be exhibited in the magic-lantern with excellent effect.

The invention relates, further, to the peculiar manner of adjusting the lens-tube in relation to the picture or picture-holder; also, to the peculiar manner of inserting the reflectors so that they can be adjusted according to the nature of the picture and of the light or lights used; finally, to the attachment to the picture-holder of hinged wings for the purpose of perfectly inclosing the light after the picture has been adjusted in the lantern.

To enable others skilled in the art to make and use my invention, I will proceed to describe it.

A represents a lantern made of sheet metal or any other suitable material, and of any convenient size or shape. One side of the lantern is made flat and provided with a square or oblong aperture, *a*, the edges of which form grooved guides for the slide *b*. This slide is also provided with an aperture, somewhat smaller than the aperture *a* in the side of the box, and grooved flanges *c*, secured to its outer surface, form the guides for the solid plate *d* or slide *b*. This slide *b* and plate *d* together form the picture-holder, the pictures being placed, one after the other, on the inside of the grooved flanges *c*, between the slide *b* and plate *d*, as clearly shown in the drawings. For the sake of convenience, the pictures ought to be made somewhat larger than the aperture in the slide *b*, or pasted on card-board or other rigid material, cut in the proper size.

The plate *d* is provided with two wings, *e*, hinged to its ends, so that they can be turned out in order to introduce a picture or remove the plate, or that they can be turned into the position shown in Fig. 2 of the drawings, for the purpose of preventing the light escaping from the interior of the lantern into the room.

The interior of the lantern A is occupied by two (more or less) lamps. B, which may be arranged to burn oil or other liquid of any desired description, provided they produce light enough to produce the desired effect. According to my present experience, ordinary coal-oil or kerosene lamps answer the purpose, the size of these lamps, of course, being accommodated to the size of the lantern. In order to make room for the chimneys of these lamps, two tubular projections, C, are secured to the top of the lantern, right over the lamps, and these tubes are covered by caps D', which are turned down over their edges and leave an open space all around to prevent the escape of light without obstructing the egress of the products of combustion. The lamps may be confined in suitable sockets formed by cylindrical flanges secured to the bottom of the lantern, and in this case they will be introduced through the aperture *a* in the side, or they may be introduced from the bottom and fastened in any suitable manner.

Said lamps are arranged as close to the picture-holder as may be practicable without overheating or changing the pictures and the rays of light emitted from said lamps are concentrated on the picture by the action of two or more reflectors, D, which are secured to the interior of the lantern opposite the picture-holder, as clearly shown in Fig. 2 of the drawings. Each of these reflectors is provided with a stem, $d'$, projecting from the center of its back through a tubular socket in the side of the lantern, so that by pushing said stems in or drawing them out the reflectors can be adjusted from the outside, according to the nature of the lights and various pictures to be exhibited in the lantern.

Flanges $e'$, which are secured to the stems outside the sockets, prevent the reflectors being pushed in any farther than desirable, and injury to the lamp chimneys, if the reflectors should be pushed against them, or to the reflectors, if they should be brought too close to the flames, is avoided.

E is the lens-tube, which is constructed on the principle of a telescope, so that it can be elongated at pleasure. This lens-tube is provided with a lens, $f$, at or close to its inner end, and with another lens, $g$, near to its outer end. These lenses may be finished with more or less care, according to the price at which the various instruments are to be sold, and they are arranged in relation to each other according to the well known optical rules.

The inner end of the lens-tube projects into the interior of the lantern to such a distance that the lens $f$ is protected from the direct rays of light emanating from the flames of the lamps, and that said lens is brought close to the picture in the picture-holder. The light concentrated on said pictures directly from the flames and by the reflectors D, combined with the action of the inner lens, $f$, produces an image in the lens-tube and by adjusting the outer lens, $g$, in the proper focus this image is enlarged and thrown on a screen or wall at a certain distance from the lantern. The image thus produced shows all the colors of the original picture with a beautiful effect.

My lantern can be used for pictures of any description, but it is particularly adapted for such pictures the surface of which is dull and not covered with glass. Oil paintings coated with glossy varnish, or photographs coated with albumen or other glossy material, do not produce so good an effect as plain photographic pictures not varnished, or lithographs, wood-cuts, or engravings printed from steel or copper plates, or pictures of any description with a dull or non-reflecting surface.

In using my instrument great care must be taken to have the lights properly adjusted and to keep the lamp chimneys, reflectors, and lenses perfectly clean, and after the picture has been adjusted the room in which the exhibition is to be taken place ought to be perfectly darkened and all escape of light from the interior of the lantern must be prevented.

The pictures to be exhibited may either be arranged on single cards or boards, or they may be placed on an endless apron or on a long strip of canvas running over rollers which are secured to suitable arbors on both ends of the picture-holder. By imparting a rotary motion to these rollers or to one of them the pictures are brought one after the other opposite the lens-tube in the proper position to be exhibited.

If desired, the lantern can be made large enough to admit the operator in its interior, and by doing so the effect of the exhibition can be considerably improved.

What I claim as new, and desire to secure by Letters Patent, is—

1. A magic-lantern producing on a screen outside the lantern by reflection an image of a picture of any desired description placed in the lantern, substantially in the manner herein specified.

2. The picture-holder $b\ c\ d$, or its equivalent, arranged in that side of a magic-lantern, A, opposite the lens tube E, in combination with one or more lamps, B, and reflectors D, constructed and operating in the manner and for the purpose substantially as herein shown and described.

3. Extending the lens-tube E far enough in the interior of the lantern so that the lens $f$, at its inner end is not exposed to the direct rays of light emanating from the flames of the lamps B, as and for the purpose specified.

4. The stems $d'$, projecting from the backs of the reflectors D, and provided with flanges $e'$, in combination with the lantern A, constructed and operating in the manner and for the purpose substantially as set forth.

5. The hinged wings $e$, in combination with the plate $d$ and slide $a$, constructed and operating substantially as and for the purpose described.

GEO. SIBBALD.

Witnesses:
W. W. DOUGHERTY,
J. L. LAFFITT.